Dec. 29, 1925.  M. S. RODSTEIN  1,567,619

ADJUSTABLE AUTOMOBILE HAT RACK

Filed March 19, 1923

Inventor:
M. S. Rodstein
by  E. F. Wendroth
Atty.

Patented Dec. 29, 1925.

1,567,619

UNITED STATES PATENT OFFICE.

MICHAEL S. RODSTEIN, OF MANHATTAN BEACH, NEW YORK.

ADJUSTABLE AUTOMOBILE HATRACK.

Application filed March 19, 1923. Serial No. 626,202.

*To all whom it may concern:*

Be it known that I, MICHAEL S. RODSTEIN, a citizen of the United States, residing at 29 Mater Court, Manhattan Beach, New York, have invented certain new and useful Improvements in Adjustable Automobile Hatracks, of which the following is a specification.

This invention relates to a hat holder or rack, and more particularly to a holder adapted for use with an automobile, whereby occupants of a machine will be afforded a ready receiving means for their various hats.

One of the objects of this invention is to provide a hat rack, particularly adapted for use with an automobile top, the rack being readily placed in operative position.

Another object is to provide a hat rack, which is readily and universally adjustable, and which does not in any way mar or harm the machine with which used.

Further objects are, to decrease the cost of manufacture, to increase the efficiency, and to prolong the life of devices of this character.

Further objects may appear in the following detailed description and the claims, reference being had to the accompanying drawings, wherein, Fig. 1 is a general perspective view of the device in operative position;

Figure 1:
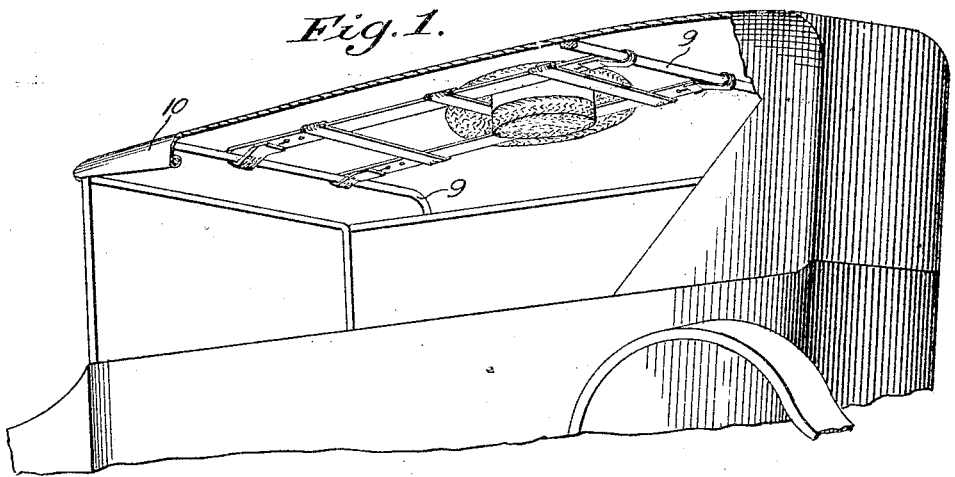
Figure 2:
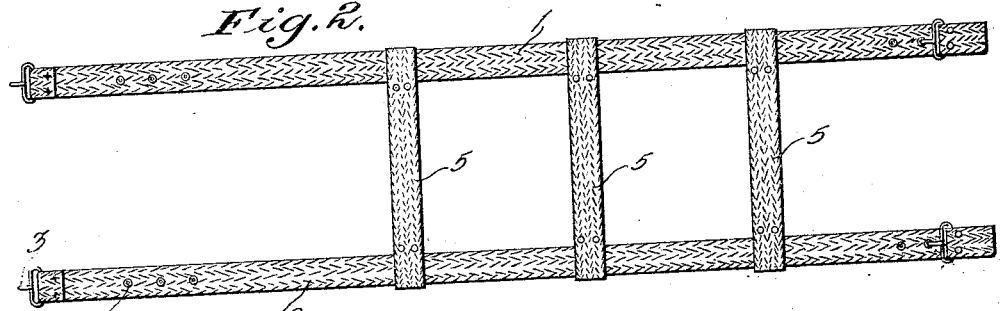
Fig. 2 is a plan view of the hat rack in detached position.
Figure 3:
Fig. 3 is a detail showing the manner of attachment to an automobile top cross bow.
Figure 4:
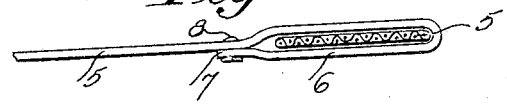
Fig. 4 is a detail of a side, and a cross, strap.

The improved hat rack comprises, generally, two side straps, 1 and 2, having attaching hooks 3, at each of their ends, for cooperation with a plurality of eyelets 4, in each of the ends of the side straps. Connected to straps 1 and 2, and at right angles thereto, is a plurality of cross straps 5, the cross straps 5 being looped around the side straps, as at 6, with their ends 7, fastened, in any approved manner, as by rivets 8.

It will now be clear from Fig. 1, just how the device is placed in its operative position. The ends of the side straps are looped around the bows 9 of the automobile top 10, and the hooks 3 are inserted into the proper eyelets 4. Since there is a plurality of eyelets 4 in each of the ends of the side straps 1 and 2, the rack is readily adjustable to accommodate it to bows of various diameters, and to bows which are variously spaced. Furthermore the cross straps 5, are readily slidable on the side straps, to accommodate hats of various sizes.

The hats are positioned in the rack as shown in Fig. 1, the brim bearing against the automobile top, and the crown projecting through one of the openings formed by the side straps, and two cross straps.

The strap members can be formed of any suitable material, such as silk or cotton webbing, and can be either non-elastic or elastic. In the preferred form, however, it is made of a strong, non-elastic webbing.

It is now clear that the device is of a universally adjustable character, is very readily attachable, and that it in no way mars or harms the structure to which it is attachable.

While the device has been described as particularly adapted for use with automobiles, it may be equally valuable in other relations, and it should accordingly be clearly understood that the invention is not limited to such use.

The foregoing detailed description has been given for the sake of illustration of a preferred form of the invention, and should not in any manner whatsoever, be considered in a limiting sense.

What I now claim as my invention, and desire to protect by Letters Patent of the United States, is:

1. A hat holding device having means for securing it to the bows of a vehicle top or similar rigid object, comprising in combination a plurality of side straps formed of non-elastic webbing, attaching hooks connected to the ends of the side straps, a plurality of eyelets near each end of the side straps, and a plurality of cross straps formed of non-elastic webbing, each cross strap having its ends loosely looped around the side straps and slidable thereon, and said side straps being secured to the vehicle bows by looping the ends of the straps around said bows and maintaining them in position by said hooks and eyelets.

2. A hat holding device having means for securing it to the bows of a vehicle top or similar rigid object, comprising in combination a plurality of side straps formed of non-elastic webbing, attaching hooks connected to the ends of the side straps, a plurality of eyelets near each end of the side straps along the axis of the same, and a plurality of cross-straps formed of non-elastic webbing, each cross-strap having its ends loosely looped around the side straps, said side straps at each end being adapted to be adjustably looped around the bows and secured by means of the hooks and eyelets, the cross straps being slidably adjustable on the side straps for forming hat holding spaces of varying sizes between the side straps and cross straps.

In testimony whereof I have signed my name to this specification.

MICHAEL S. RODSTEIN.